United States Patent
Kang et al.

(10) Patent No.: US 8,508,872 B2
(45) Date of Patent: Aug. 13, 2013

(54) LENS ACTUATING MODULE

(75) Inventors: Byung Hoon Kang, Seoul (KR); Sung Won Min, Gyeonggi-do (KR); Jung Wook Hwang, Gyeonggi-do (KR); Dong Kyun Lee, Seoul (KR); Ki Mun Paik, Gyeonggi-do (KR); Jung Seok Lee, Gyeonggi-do (KR); Won Seob Oh, Gyeonggi-do (KR); Chuel Jin Park, Gyeonggi-do (KR); Soo Cheol Lim, Gyeonggi-do (KR); Byung Woo Kang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/326,552

(22) Filed: Dec. 15, 2011

(65) Prior Publication Data

US 2012/0154937 A1 Jun. 21, 2012

(30) Foreign Application Priority Data

Dec. 16, 2010 (KR) ........................ 10-2010-0129225

(51) Int. Cl.
*G02B 7/02* (2006.01)
(52) U.S. Cl.
USPC ............................ 359/824; 359/819; 359/822
(58) Field of Classification Search
USPC .................................. 359/694–704, 811–824
See application file for complete search history.

(56) References Cited

U.S. PATENT DOCUMENTS

| 6,215,970 | B1 | 4/2001 | Kuwana et al. | |
| 6,268,970 | B1 | 7/2001 | Ito et al. | |
| 7,446,963 | B2 * | 11/2008 | Lee et al. | 359/824 |
| 7,990,636 | B2 * | 8/2011 | Park et al. | 359/824 |
| 2011/0063743 | A1 * | 3/2011 | Ko et al. | 359/824 |

FOREIGN PATENT DOCUMENTS

| JP | 3154894 | 10/2009 |
| KR | 2000-55180 | 9/2000 |
| KR | 10-2008-0085571 | 9/2008 |
| KR | 10-2009-0040254 | 4/2009 |

OTHER PUBLICATIONS

Korean Notice of Allowance issued Jun. 11, 2012 in corresponding Korean Patent Application No. 10-2010-0129225.

* cited by examiner

*Primary Examiner* — Mohammed Hasan

(57) ABSTRACT

Disclosed herein is a lens actuating module for realizing focus adjustment and optical zooming. The lens actuating module includes a rod which is disposed on one side of a lens barrel on which at least one lens is mounted, and has an axis direction corresponding to an optical axis direction of the lens barrel, a driving force transmission member which has a conjoining recess to be conjoined with an outside surface of the rod and has magnetism so as to be conjoined with the outside surface of the rod due to a magnetic force, and a piezoelectric actuator which is disposed on one side of the driving force transmission member in the optical axis direction to provide an axis direction driving force to the rod via the driving force transmission member.

8 Claims, 12 Drawing Sheets

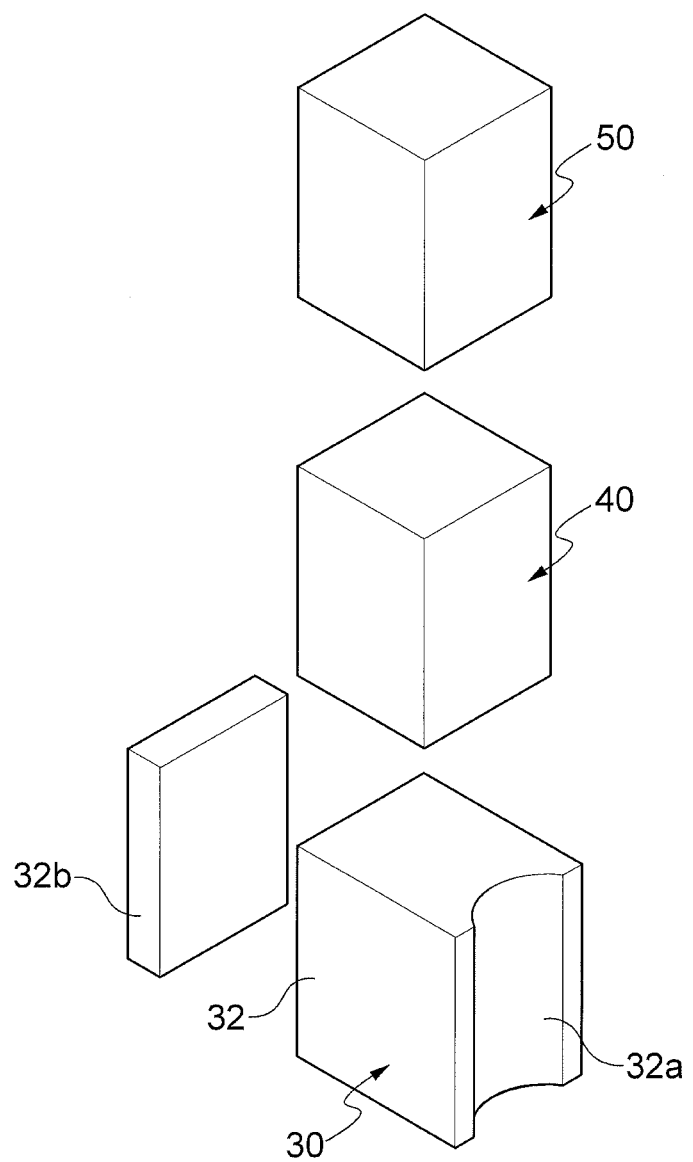

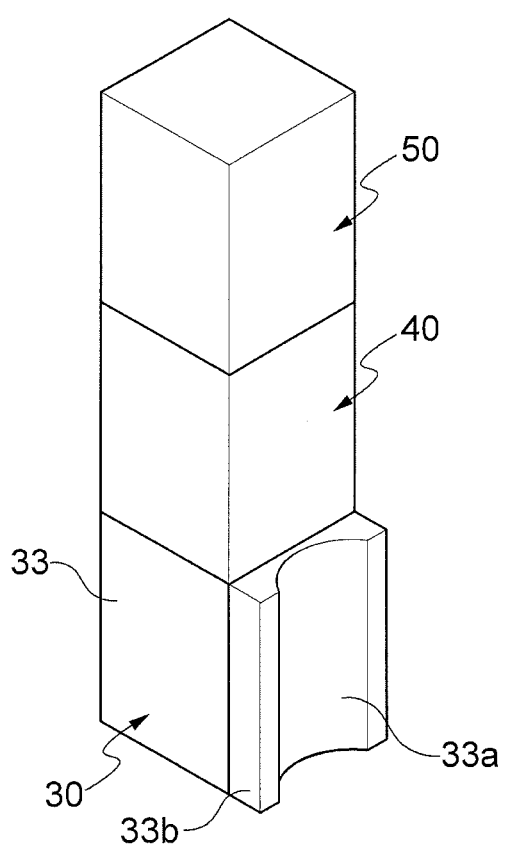

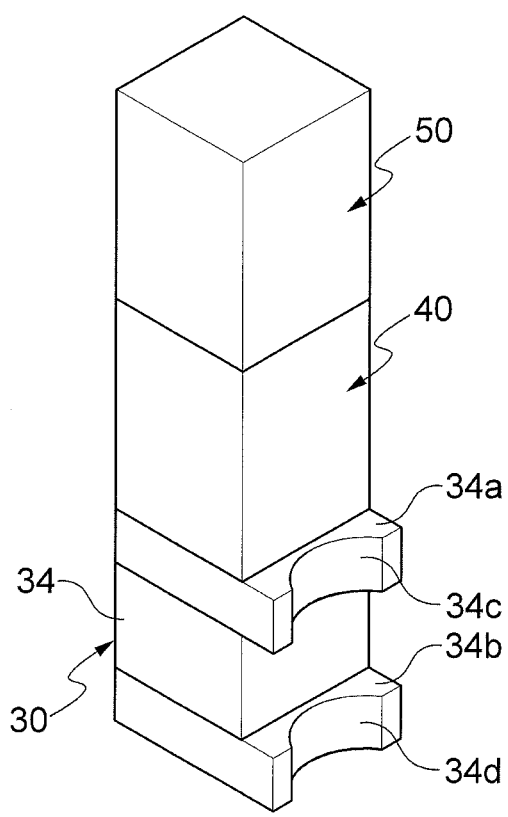

LENS ACTUATING MODULE

CROSS REFERENCE(S) TO RELATED APPLICATIONS

This application claims the benefit under 35 U.S.C. Section 119 of Korean Patent Application Serial No. 10-2010-0129225, entitled "Lens Actuating Module" filed on Dec. 16, 2010, which is hereby incorporated by reference in its entirety into this application.

BACKGROUND OF THE INVENTION

1. Technical Field

The present invention relates to a lens actuating module to actuate a lens barrel in an optical axis direction, and more particularly, to a lens actuating module that has a simplified structure to transmit a driving force of a piezoelectric actuator to a lens barrel, and can achieve miniaturization and minimize limitation on a migration length of the lens barrel and a tilting phenomenon around an optical axis when the lens barrel is actuated.

2. Description of the Related Art

With the recent development of optics, optical instruments such as cameras, camcorders, and small camera modules for mobile devices have been developed around high-pixel devices of 7,000,000 or more pixels and also have been developed to be able to perform additional functions such as auto focusing and optical zooming.

Such optical instruments realize the zoom-function or the auto-focusing by changing a relative distance of a lens by vertically moving the lens, and include a lens conveyance device to vertically actuate the lens or a lens barrel in which the lens is mounted.

The optical instruments having such additional functions increase the number of parts embedded in a camera module since the lens is conveyed using an electromagnetic motor, and as a result, an entire size thereof may be unavoidably larger than a general camera module.

Accordingly, when the camera module is to be mounted in a limited space such as a mobile terminal, it is difficult to assembly the camera module due to an insufficient space in a body of the terminal to mount the camera module.

FIG. 1 is a view of a related art lens actuating structure, which is disclosed in U.S. Pat. No. 6,268,970, entitled 'Zoom Lens Barrel'. The related art lens actuating apparatus includes frames to support lens groups 120, 130, and 140 and cam tubes 160 and 170 to support the frames. The cam tubes function to allow the frames to move lenses in an axis direction and are actuated by a driving actuator 110.

According to a zooming method of this cam structure, a relative position of each lens is determined by the shape of the cam in the zoom operation. As such, a focus lens and an actuating unit for focusing at a specific ratio are additionally required and an actuating mechanism such as a final reduction gear and a lens holding structure moving along the cam may be complicated.

FIG. 2 is a view of another related art lens actuating structure, which is disclosed in Korean Patent Laid-Open Publication No. 2000-55180, entitled "Zoom Lens Mechanism of Camera". In this disclosure, a fixing lens group 201 comprising a plurality of lenses is mounted in a camera body 200. The camera body 200 has a storage space formed therein and a zoom motor 203 is stored in the storage space. A guide screw 205 is connected to a shaft of the zoom motor 203 and a screw ridge and a screw groove are formed along an outer circumference of the guide screw 205. Also, a clip 207 is connected to the outer circumference of the guide screw 205 to transmit a driving force. The clip 207 has a corresponding screw ridge and a corresponding screw groove formed on one side thereof contacting the guide screw 205, so that the one side of the clip 207 is engaged with the screw ridge and the screw groove of the guide screw 205. The other side of the clip 207 is engaged with a zoom barrel 209. The zoom barrel 209 is connected to a moving lens group 202. The zoom barrel 209 is slidably connected to a guide shaft 211 arranged in an optical axis direction so that the zoom barrel 209 slides along the guide shaft in the optical axis direction.

In a zoom lens mechanism of the camera described above, when the zoom motor 203 is rotated, the guide screw 205 is also rotated. After that, the guide screw 205 is rotated and its rotational force is converted into a linear motion through the clip 207. Accordingly, the clip 207 linearly moves in the optical axis direction. As the clip 207 linearly moves, the zoom barrel 209 moves in the optical axis direction. When the zoom barrel 209 moves in the optical axis direction, a portion of the zoom barrel 209 contacting the guide shaft 211 slides so that the zoom barrel 209 reciprocates in the optical axis direction within a predetermined section.

Since the related art zoom lens mechanism described above uses an electromagnetic motor, there is a problem in that an electromagnetic wave occurs. As such, there is a problem in that use of the zoom lens mechanism in a small communication device is limited. Also, when the electromagnetic motor is used, a final reduction gear is used but complicates a mechanical structure. Also, there is a problem in that the zoom lens and the focusing lens should be independently moved in order to perform focusing.

Recently, in order to solve the above problems and use the zooming function in smaller optical devices, micro-optical zoom instruments have been developed. The micro-optical mechanism is increasingly using an intelligent element such as a piezoelectric element, rather than using a related art actuating method by the electromagnetic motor. By substituting the related art motor actuating method, the actuating structure to actuate the lens can be simplified and high efficiency can be achieved by directly actuating.

A zoom lens device using such a piezoelectric element is illustrated in FIGS. 3 and 4. FIG. 3 is a view of still another lens actuating structure disclosed in U.S. Pat. No. 6,215,605, entitled 'Driving Device'. The related art lens actuating device fixes piezoelectric elements 311 and 312 to base blocks 321 and 322 and transmit displacement to actuating round bars 316 and 317, and conveys lenses L2 and L4 by a preload occurring in slide parts 331a and 332a, an inertial force of the lens holder 331 and 332, and an acceleration effect. According to a waveform of a pressure that the piezoelectric element 312 has, the lens holder is conveyed along with the round bar or conveyed by a motion in which the lens holder slides and stays in position, and may also be conveyed bi-directionally.

In practice, the lens actuating device of FIG. 3 may be arranged in a pattern and used as in FIG. 4. At this time, if displacement of one of the neighboring piezoelectric elements 311a and 311b is transmitted through the base block 313, the displacement may be transmitted to another lens. Therefore, a recess 313g is formed on the base block 313 to prevent the displacement from being transmitted between the piezoelectric elements. However, a process of forming this recess may make the structure more complicated and causes difficulty in processing. Also, a displacement interference problem between the piezoelectric elements cannot be completely solved.

Also, a length of the actuating round bars 316 and 317, which are moved forwards and backwards by the piezoelectric element to convey the lens, is limited by a size of the piezoelectric element, and this limitation on the length of the actuating round bar results in limitation of a lens conveyance length, thereby affecting performance of a product.

Also, in this case, since the actuating round bar is fundamentally fixed, it is impossible to change a length of a body tube in which the lens is embedded, and, since an extra space for actuating elements is required besides the space for the conveyance length of the lens, it is difficult to miniaturize the entire size of the device. Also, since the actuating round bar supports only one end of the lens part, asymmetrical displacement of the lens occurs in the actuating operation and thus may cause unstable actuating.

SUMMARY OF THE INVENTION

The present invention has been developed in order to solve the above problems arising in the related art lens conveyance device, and an object of the present invention is to provide a lens actuating module, which can realize an optical axis direction movement of a lens barrel with a simplified structure and a system, and minimize or prevent limitation on a migration length and a titling phenomenon when the lens barrel moves.

According to an exemplary embodiment of the present invention, there is provided a lens actuating module, including: a rod which is disposed on one side of a lens barrel on which at least one lens is mounted, and has an axis direction corresponding to an optical axis direction of the lens barrel, a driving force transmission member which has a conjoining recess to be conjoined with an outside surface of the rod and magnetism so as to be conjoined with the outside surface of the rod by magnetic force, and a piezoelectric actuator which is disposed on one side of the driving force transmission member in the optical axis direction to provide an axis direction driving force to the rod via the driving force transmission member.

The driving force transmission member may include a magnet which is integrally formed with the conjoining recess and is formed in a horizontal magnetization pattern or a vertical magnetization pattern, and in which magnetization polarities facing each other are opposite polarities.

The driving force transmission member may further include a magnetic material, which is disposed on one side surface of the magnet opposite to the conjoining recess to increase a magnetic force.

The driving force transmission member may include a magnet in a horizontal magnetization pattern or a vertical magnetization pattern, and a guide, which has the conjoining recess and is attached to one side surface of the magnet.

The guide may be formed of a non-magnetic material and may be attached to the one side surface of the magnet.

The driving force transmission member may include a magnet in a horizontal magnetization pattern or a vertical horizontal magnetization, a first magnetic material which is disposed on one side surface of the magnet contacting the piezoelectric actuator to increase a magnetic force, and a second magnetic material which is disposed on the other side surface of the magnet opposite to the first magnetic material to increase the magnetic force, and the first magnetic material and the second magnetic material may include a first conjoining recess and a second conjoining recess, respectively, to form the conjoining recess.

The lens actuating module may further include a weight, which is disposed on one side of the piezoelectric actuator opposite to the driving force transmission member to support actuating of the piezoelectric actuator.

The lens actuating module may further include a reinforcement layer, which is disposed on at least one of the conjoining recess and the outside surface of the rod to reinforce strength and prevent oxidization between the driving force transmission member and the rod.

The reinforcement layer may be formed in a coating film pattern in which one metallic material of ceramic, tungsten, titanium, chrome, and aluminum is mixed with one of a carbon compound and a nitrogenous compound.

BRIEF DESCRIPTION OF THE DRAWINGS

FIGS. 12A and 12B are an assembly perspective view and an exploded perspective view illustrating a second embodiment of the driving force transmission member of FIG. 5;

FIGS. 13A and 13B are an assembly perspective view and an exploded perspective view illustrating a third embodiment of the driving force transmission member of FIG. 5; and FIGS. 14A and 14B are an assembly perspective view and an exploded perspective view schematically illustrating a fourth embodiment of the driving force transmission member of FIG. 5.

DESCRIPTION OF THE PREFERRED EMBODIMENTS

The technical constitution for the above objects and the operation effect of a lens actuating module according to the present invention will be more apparent by describing exemplary embodiments in greater detail with reference to the accompanying drawings.

Figure 1:
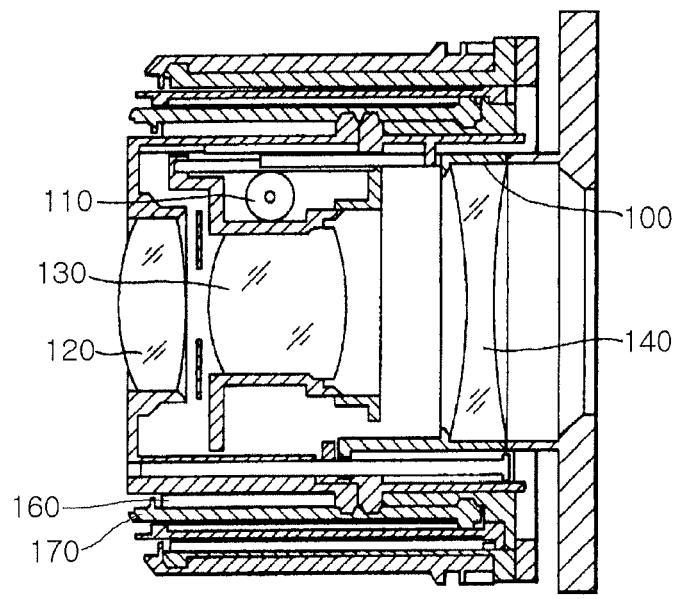
FIG. 1 is a cross sectional view of a related art lens conveyance device.
Figure 2:
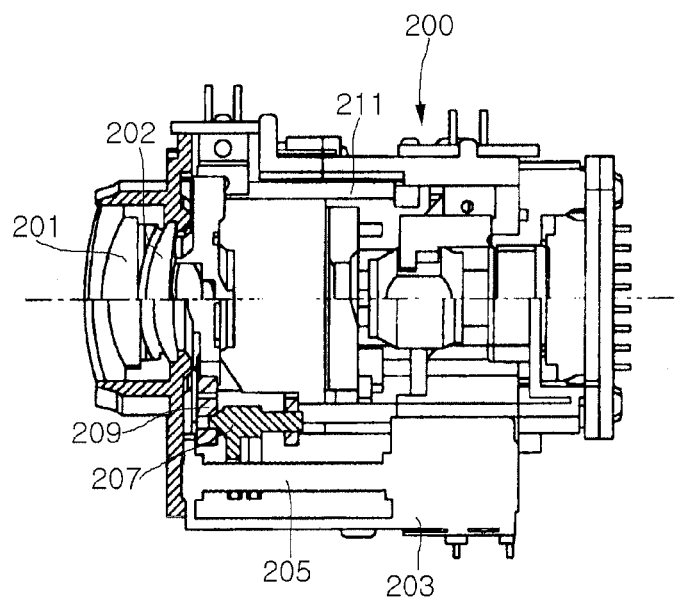
FIG. 2 is a cross sectional view of another related art lens conveyance device.
Figure 3:
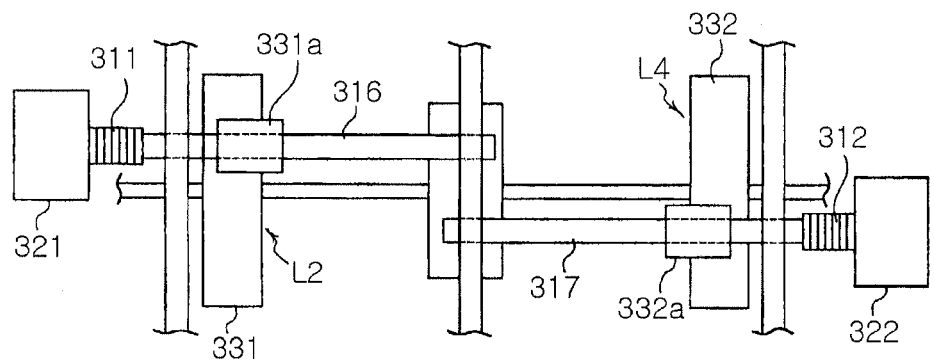
FIG. 3 is a cross sectional view of still another related art lens conveyance device.
Figure 4:
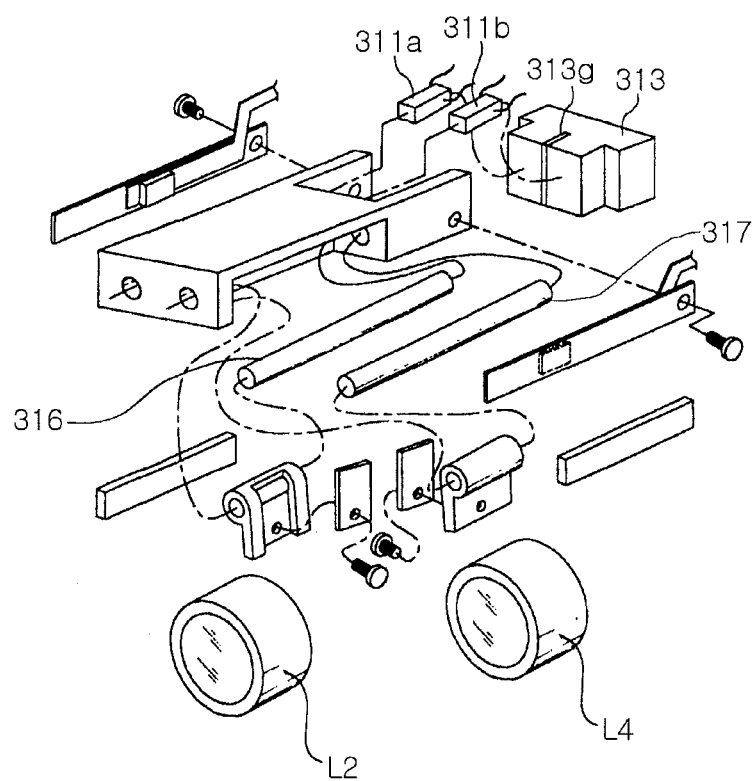
FIG. 4 is an assembly view of the lens conveyance device of FIG. 3.
Figure 5:
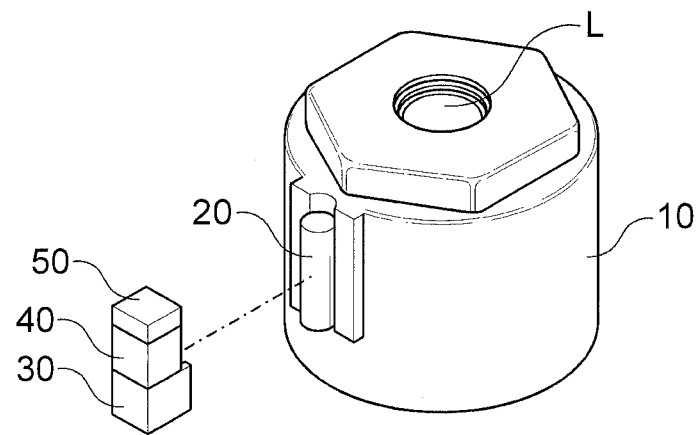
FIG. 5 is an exploded perspective view schematically illustrating a lens actuating module according to an exemplary embodiment.
Figure 6:
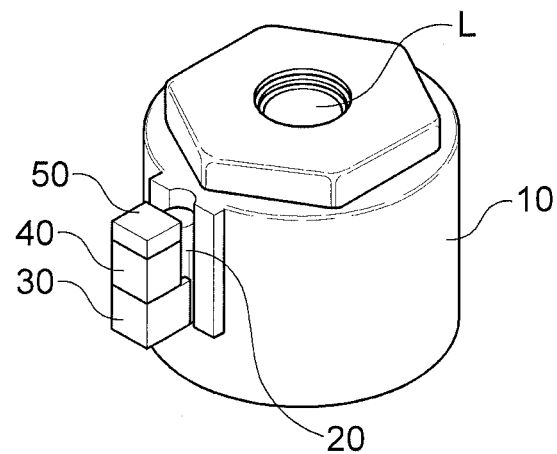
FIG. 6 is an assembly perspective view of FIG. 5.
Figure 7A:
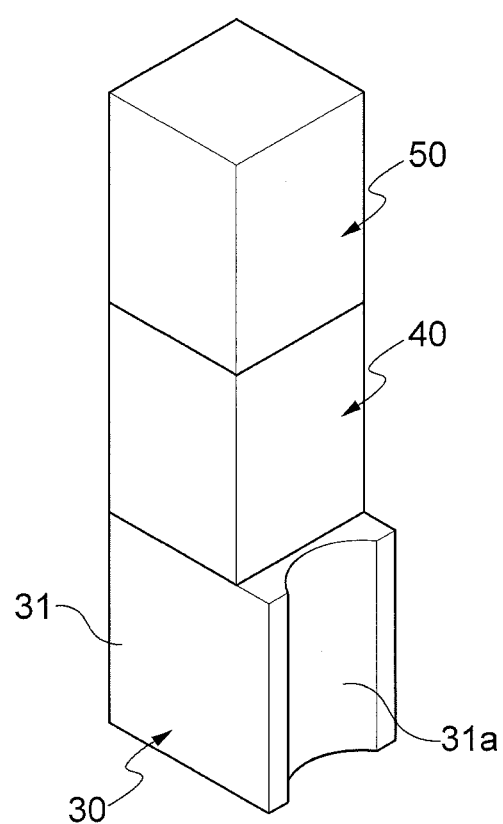
FIGS. 7A and 7B are an assembly perspective view and an exploded perspective view illustrating a first embodiment of a driving force transmission member of FIG. 5.
Figure 7B:
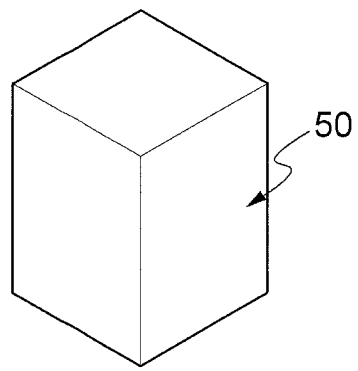
Figure 7B:
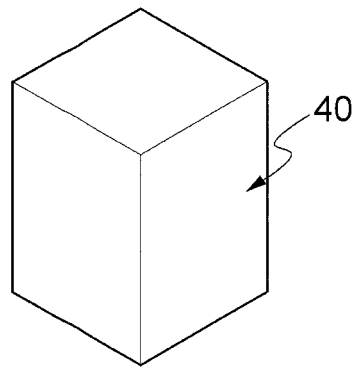
Figure 7B:
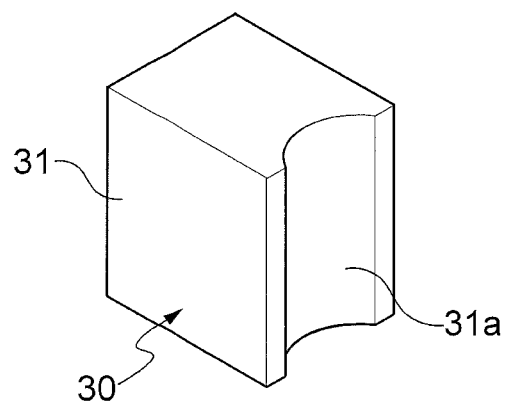
Figure 9:
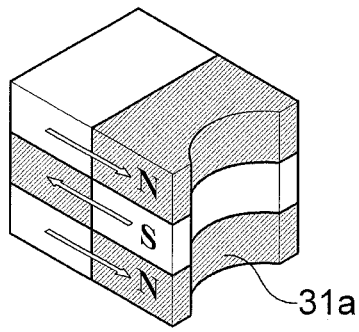
Figure 10:
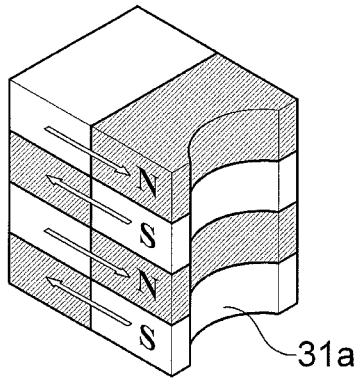
Figure 11:
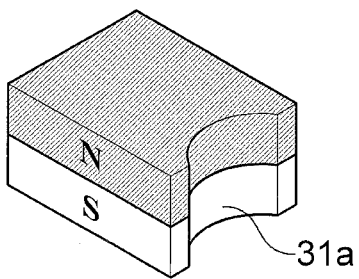
FIG. 11 is a perspective view illustrating a vertical magnetization pattern of the magnet of FIG. 7.

FIG. 5 is an exploded perspective view schematically illustrating a lens actuating module according to an exemplary embodiment, FIG. 6 is an assembly perspective view of FIG. 5, FIGS. 7A and 7B are an assembly perspective view and an exploded perspective view illustrating a first embodiment of a driving force transmission member of FIG. 5, FIGS. 8 to 10 are perspective views illustrating a horizontal magnetization pattern, which is one of the magnetization patterns of a magnet of FIG. 7, and FIG. 11 is a perspective view illustrating a vertical magnetization pattern of the magnet of FIG. 7.

Figure 12A:
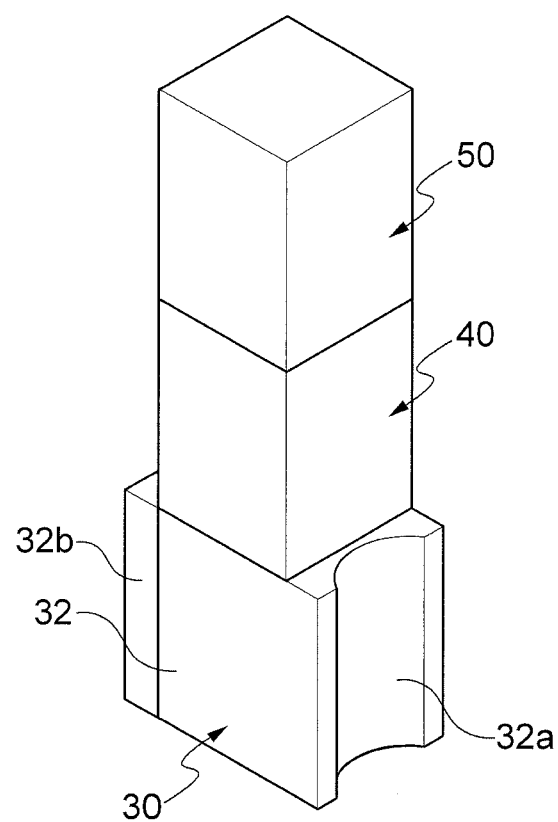
Figure 13B:
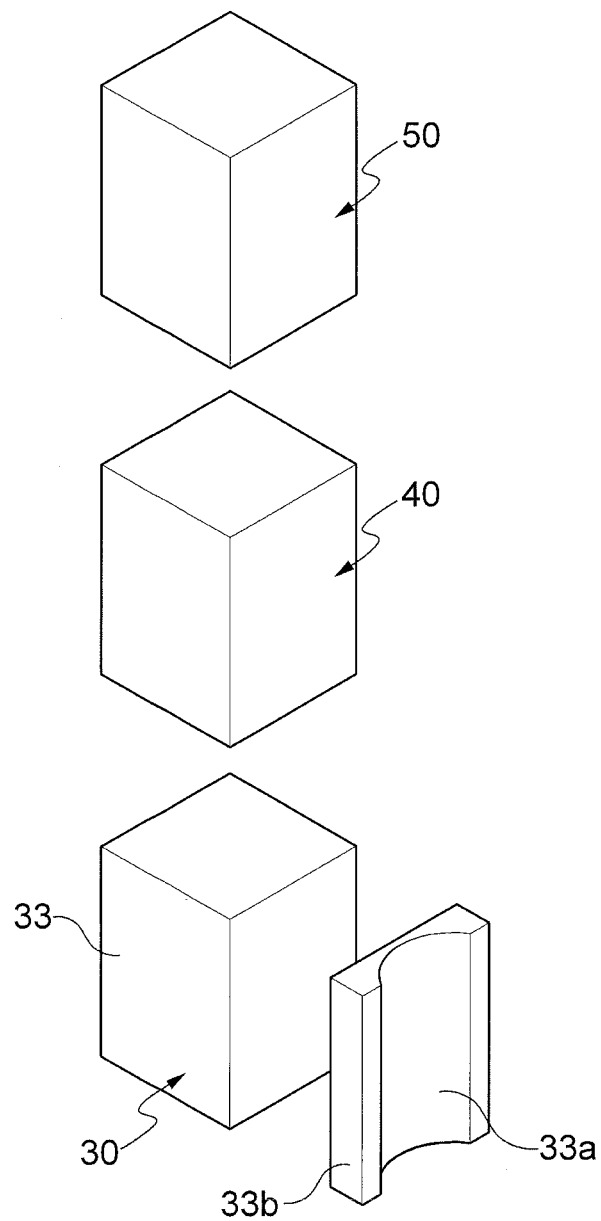
Figure 14B:
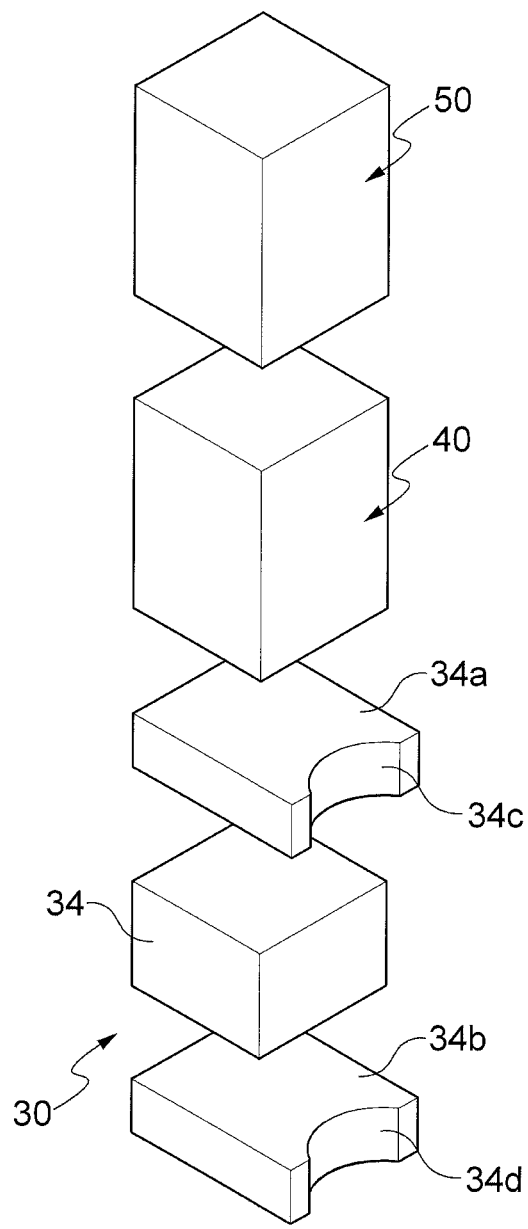

FIGS. 12A and 12B are an assembly perspective view and an exploded perspective view illustrating a second embodiment of the driving force transmission member of FIG. 5, FIGS. 13A and 13B are an assembly perspective view and an exploded perspective view illustrating a third embodiment of the driving force transmission member of FIG. 5, and FIGS. 14A and 14B are an assembly perspective view and an exploded perspective view illustrating a fourth embodiment of the driving force transmission member of FIG. 5.

First, referring to FIGS. 5 to 11, a lens actuating module according to an exemplary embodiment will be explained.

As shown in FIGS. 5 and 6, a lens actuating module according to an exemplary embodiment includes a rod 20 which is disposed on one side of a lens barrel 20 on which at least one lens L is mounted and has an axis direction corresponding to an optical axis direction of the lens barrel 10, a driving force transmission member 30 which has a conjoining recess 31 to be conjoined with an outside surface of the rod 20 and has magnetism so as to be connected to the outside surface of the rod 20 due to magnetic force, and a piezoelectric actuator 40 which is disposed on one side of the driving force transmission member 30 in the optical axis direction to provide an axis direction driving force to the rod 20 via the driving force transmission member 30.

FIGS. 7A and 7B are views illustrating a first embodiment of the driving force transmission member 30. According to the first embodiment, the driving force transmission member may include a magnet 31 integrally formed with a conjoining recess 31a.

Figure 8:
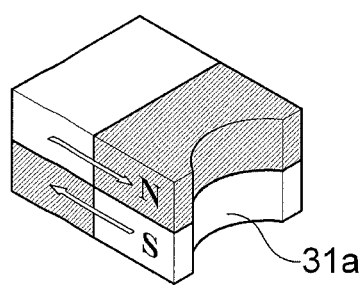
FIGS. 8 to 10 are perspective views illustrating a horizontal magnetization pattern, which is one of the magnetization patterns of a magnet of FIG. 7.

More specifically, as shown in FIG. 8, the driving force transmission member 30 may be formed in a horizontal magnetization pattern such that magnetization polarities facing each other horizontally oppose each other, that is, an N pole and an S pole are horizontally positioned (in a direction perpendicular to the optical axis of the lens barrel). In order to increase the magnetic force, as shown in FIGS. 9 and 10, a magnet in which an N pole and an S pole are horizontally positioned and a magnet in which an S pole and an N pole are horizontally positioned are alternately stacked in a multi-layered pattern.

As shown in FIG. 11, the driving force transmission member may be formed in a vertical magnetization pattern such that magnetization polarities facing each other vertically oppose each other, that is, an N pole and an S pole are vertically positioned (in the optical axis direction of the lens barrel). In order to increase the magnetic force, magnets in which the N pole and the S pole are vertically positioned are alternately stacked in a multi-layered pattern.

The above-described lens actuating module actuates the piezoelectric actuator 40 in parallel to the optical axis direction of the lens barrel 10, in other words, in parallel to a direction in which the lens barrel 10 moves, and connects the piezoelectric actuator 40 to the rod of the lens barrel 10 via the driving force transmission member 30 using the magnetic force, so that structure and constitution of the lens actuating module can be simplified, and miniaturization, in particular, slimming of the lens barrel 10 in the optical axis direction, i.e., in the moving direction can be achieved.

Also, according to the lens actuating module of the present invention, the rod 20 disposed on the lens barrel 10 moves with the conjoining recess 31a of the driving force transmission member 30 being conjoined thereto, so that limitation on a migration length of the lens barrel 10 and a tilting phenomenon in which an optical axis is tilted can be minimized.

Also, the lens actuating module of the present invention may further include a weight 50 disposed on one side of the piezoelectric actuator 40 opposite to the driving force transmission member 30 to support actuating of the piezoelectric actuator 40.

Also, the lens actuating module of the present invention may further include a reinforcement layer formed on one of the conjoining recess 31a and the outside surface of the rod 20. By providing the reinforcement layer, strength reinforcement, and antioxide against a friction between the driving force transmission members 30, i.e., the conjoining recess 31a, and the rod 20 can be achieved when the piezoelectric actuator 40 is actuated, and as a result, durability to abrasion and tolerance to moisture can be improved.

The reinforcement layer may be formed in a coating film pattern in which one of the ceramic, tungsten, titanium, chrome, and aluminum is mixed with one of a carbon compound and a nitrogenous compound.

Next, FIGS. 12A and 12B are views illustrating a second embodiment of the driving force transmission member. In the present embodiment, the driving force transmission member includes a magnet 32 having a conjoining recess 32a and a magnetic material 32b formed on one side surface of the magnet 32 opposite to the conjoining recess 32a to increase a magnetic force.

In other words, in the present embodiment, by adding the magnetic material 32b to the one side surface of the magnet 32 to block a leakage magnetic force line of the magnet, the magnetic force of the magnet 32 can be improved.

Although not shown in detail, in the driving force transmission member of the present embodiment, the magnet 32 may be configured in a horizontal magnetization pattern or a vertical magnetization pattern, and also may be configured in a multi-layered pattern, like the driving force transmission member of the first embodiment.

Next, FIGS. 13A and 13B are views illustrating a third embodiment of the driving force transmission member. The driving force transmission member of the present embodiment includes a magnet 33 and a guide 33b, which has a conjoining recess 33a conjoined with the rod of the lens barrel and is attached to one side surface of the magnet 33.

In other words, in the present embodiment, the guide 33b, which is formed of a non-magnetic material, is attached to the one side surface of the magnet 33 by an adhesive, and accordingly, the guide 33b is kept being conjoined with the outside surface of the rod due to the magnetic force of the magnet 32.

Although not shown in detail, in the driving force transmission member of the present embodiment, the magnet 33 may be configured in a horizontal magnetization pattern or a vertical magnetization pattern, and also may be configured in a multi-layered pattern, like the driving force transmission member of the first embodiment.

In the present embodiment, since the conjoining recess 33a is formed on the guide 33b, the above-described reinforcement layer may be formed on at least one of the conjoining recess 33a of the guide 33b and the outside surface of the rod 20 with which the conjoining recess 33a is conjoined.

Next, FIGS. 14A and 14B are views illustrating a fourth embodiment of the driving force transmission member. The driving force transmission member of the present embodiment includes a magnet 34, a first magnetic material 34a which is disposed on one side surface of the magnet 34 contacting the piezoelectric actuator 40 to increase a magnetic force of the magnet 34, and a second magnetic material 34b which is disposed on the other side surface of the magnet 34 opposite to the first magnetic material 34a to increase the magnetic force of the magnet 34.

In the present embodiment, the first magnetic material 34a and the second magnetic material 34b are disposed on both side surfaces of the magnet 34 such that a first conjoining recess 34c is formed on the first magnetic material 34a and a second conjoining recess 34d is formed on the second magnetic material 34b and the first conjoining recess 34c and the second conjoining recess 34d form a conjoining recess to be conjoined with the outside surface of the rod of the lens barrel.

Only one of the first conjoining recess 34c and the second conjoining recess 34d may be formed. However, in order to stably transmit the driving force of the piezoelectric actuator 40 to the rod of the lens barrel via the driving force transmission member and stably support the rod, it is preferable that the first conjoining recess 34c and the second conjoining recess 34d are formed altogether.

Although not shown in detail, in the driving force transmission member, the magnet 34 may be configured in a horizontal magnetization pattern or a vertical magnetization pattern, and also may be configured in a multi-layered pattern, like the driving force transmission member of the first embodiment.

Also, in the present embodiment, the above-described reinforcement layer may be formed on at least one of the first conjoining recess 34c, the second conjoining recess 34d, and the outside surface of the rod of the lens barrel.

As described above, the lens actuating module of the present invention actuates the piezoelectric actuator in parallel to the optical axis direction of the lens barrel 10, in other words, in parallel to a direction in which the lens barrel 10 moves, and connects the piezoelectric actuator to the rod of the lens barrel via the driving force transmission member using the magnetic force, so that structure and constitution of the lens actuating module can be simplified, and miniaturized, in particular, slimming of the lens barrel in the optical axis direction, i.e., in the moving direction can be achieved.

Also, according to the lens actuating module of the present invention, the rod of the lens barrel moves with the conjoining recess of the driving force transmission member being conjoined thereto, so that limitation on a migration length of the lens barrel and a tiling phenomenon in which an optical axis is tilted can be minimized.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. Accordingly, such modifications, additions and substitutions should also be understood to fall within the scope of the present invention.

What is claimed is:

1. A lens actuating module comprising:
a rod which is disposed on one side of a lens barrel on which at least one lens is mounted, and has an axis direction corresponding to an optical axis direction of the lens barrel; a driving force transmission member which has a conjoining recess to be conjoined with an outside surface of the rod and has magnetism so as to be conjoined with the outside surface of the rod due to a magnetic force; and
a piezoelectric actuator which is disposed on one side of the driving force transmission member in the optical axis direction to provide an axis direction driving force to the rod via the driving force transmission member;
wherein the driving force transmission member includes a magnet in a horizontal magnetization pattern or a vertical horizontal magnetization, a first magnetic material which is disposed on one side surface of the magnet contacting the piezoelectric actuator to increase a magnetic force, and a second magnetic material which is disposed on the other side surface of the magnet opposite to the first magnetic material to increase the magnetic force, wherein the first magnetic material and the second magnetic material include a first conjoining recess and a second conjoining recess, respectively, to form the conjoining recess.

2. The lens actuating module according to claim 1, wherein the driving force transmission member includes a magnet which is integrally formed with the conjoining recess and is formed in a horizontal magnetization pattern or a vertical magnetization pattern, and in which magnetization polarities facing each other are opposite polarities.

3. The lens actuating module according to claim 2, wherein the driving force transmission member further includes a magnetic material which is disposed on one side surface of the magnet opposite to the conjoining recess to increase a magnetic force.

4. The lens actuating module according to claim 1, wherein the driving force transmission member includes a magnet in a horizontal magnetization pattern or a vertical magnetization pattern, and a guide which has the conjoining recess and is attached to one side surface of the magnet.

5. The lens actuating module according to claim 4, wherein the guide is formed of a non-magnetic material and is attached to the one side surface of the magnet.

6. The lens actuating module according to claim 1, further comprising a weight which is disposed on one side of the piezoelectric actuator opposite to the driving force transmission member to support actuating of the piezoelectric actuator.

7. The lens actuating module according to claim 1, further comprising a reinforcement layer which is disposed on at least one of the conjoining recess and the outside surface of the rod to reinforce strength and prevent oxidization between the driving force transmission member and the rod.

8. The lens actuating module according to claim 7, wherein the reinforcement layer is formed in a coating film pattern in which one metallic material of ceramic, tungsten, titanium, chrome, and aluminum is mixed with one of a carbon compound and a nitrogenous compound.

* * * * *